(12) United States Patent
Iida

(10) Patent No.: US 7,126,906 B2
(45) Date of Patent: Oct. 24, 2006

(54) OPTICAL RECORD CARRIER, DRIVE UNIT, DATA UPDATING METHOD AND SOFTWARE VERSION-UP METHOD

(75) Inventor: Tamotsu Iida, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 937 days.

(21) Appl. No.: 10/024,183

(22) Filed: Dec. 21, 2001

(65) Prior Publication Data
US 2002/0097648 A1 Jul. 25, 2002

(30) Foreign Application Priority Data
Dec. 21, 2000 (JP) ............................. 2000-388982

(51) Int. Cl.
G11B 7/24 (2006.01)

(52) U.S. Cl. ................. 369/275.3; 369/275.4; 369/111

(58) Field of Classification Search ............ 369/275.3, 369/275.4, 275.1, 44.26, 277, 278, 279, 275.2, 369/286, 280, 283, 47.41, 111, 47.46, 53.2, 369/47.1
See application file for complete search history.

(56) References Cited

U.S. PATENT DOCUMENTS 5,850,382 A * 12/1998 Koishi et al. ............ 369/275.3
6,031,808 A * 2/2000 Ueno ........................ 369/111
6,850,478 B1 * 2/2005 Ishibashi et al. ......... 369/275.3

FOREIGN PATENT DOCUMENTS

| JP | 57-040760 | 3/1982 |
|---|---|---|
| JP | 59-213038 | 12/1984 |
| JP | 62-285232 | 12/1987 |
| JP | 01-154329 | 6/1989 |
| JP | 03-273567 | 12/1992 |
| JP | 05-166230 | 7/1993 |
| JP | 08-22640 | 1/1996 |
| JP | 2000-48372 A | 2/2000 |

OTHER PUBLICATIONS

Patent Office of the People's Republic of China, Office Action dated Sep. 30, 2005.

* cited by examiner

Primary Examiner—Ali Neyzari
(74) Attorney, Agent, or Firm—Birch, Stewart, Kolasch & Birch, LLP (57) ABSTRACT

A disc-shaped optical record carrier includes a first area having a spiral track extending in a first direction from an inner side on the disc, and a second area having a spiral track extending in a second direction opposite to the first direction, from an outer side on the disc located on the same plane as the first area on the disc, wherein one of the first and second areas is assigned a recordable area and the other is assigned a read only area.

18 Claims, 3 Drawing Sheets

OPTICAL RECORD CARRIER, DRIVE UNIT, DATA UPDATING METHOD AND SOFTWARE VERSION-UP METHOD

BACKGROUND OF THE INVENTION

The present invention relates generally to record carriers to be recorded and/or reproduced by optical means, and drive units for driving the record carriers, and more particularly to a disc-shaped record carrier having a characterized record structure or format, and a drive unit for recording and/or reproducing the record carrier. The present invention is suitable, for example, for an optical disc that includes both a read only (referred to as "ROM" hereinafter) area that allows a reproduction of prerecorded data, and a recordable (referred to as "RAM" hereinafter) area that may record new or additional data.

Optical discs, spread as an optical record carrier, include ROM media, such as a CD-ROM and a DVD (Digital Versatile Disc), write-once CD-Rs, other various magneto-optical record carriers, and phase change record carriers, such as a DVD-RAM. Along with the recent developing information industry, demands to optical record carriers have ranged not only the higher density but also efficient arrangements and applications of a wide variety of information. An optical disc that makes available both ROM and RAM areas has been conventionally proposed so as to meet one of such demands For example, the DVD standard stipulates for an adhesion of two disc plates and an adhesion of one disc plate to a dummy disc plate with prerecorded surface (or signal surface) facing up. An optical disc with a ROM area on its one surface and a RAM area on its other surface has been known in the art as disclosed, for example, in Japanese Laid-Open Patent Application No. 10-228673, but there exists a demand to provide one disc surface with both ROM and RAM areas.

Accordingly, the ISO (International Organization for Standardization) standard (e.g., ISO/IEC13963) regulates a partial ROM type magneto-optical disc including a pre-pit formed ROM area, and a data record area formed by address data pits and servo grooves on the same plate. In addition, a certain type, such as a DVD-RAM, forms a ROM area for storing control and other information for the entire disc on its inner (circumference) portion and a RAM area on its outer (circumference) portion. It has also been known in the art to provide both RAM and ROM areas on the same plane in one optical disc as disclosed, for example, in Japanese Patent No. 3,063,641.

For example, it is conceivable to form the ROM and RAM areas along one spiral track and to assign consecutive addresses to it. However, this would change addresses in the RAM area depending upon a length of ROM data and disadvantageously make undefined disc's control area that stores exchange and other information, resulting in the unstable recording and reproducing actions. In addition, without the prefixed capacity of the ROM area, the efficient arrangement of the data record area would be unavailable and it would be difficult to efficiently record data in a finite record area in a disc. Moreover, a drastic change in conventional drive's structure would undesirably make the drive larger, more complicated, and more expensive.

Thus, the way of arranging, addressing, recording and/or reproducing ROM and RAM areas would be critical for an optical disc having these ROM and RAM areas on the same plane.

BRIEF SUMMARY OF THE INVENTION

Accordingly, it is an exemplified general object of the present invention to provide a novel and useful optical record carrier, its drive unit, and software version-up method, in which the above disadvantages are eliminated.

It is another exemplary, more specific object to provide an optical record carrier, its drive unit, and software version-up method, which provide stable recording and/or reproducing actions and a wide variety of conveniences.

In order to achieve the above object, a disc-shaped optical record carrier of one aspect of the present invention includes a first area having a spiral track extending in a first direction from an inner side on the discs and a second area having a spiral track extending in a second direction opposite to the first direction, from an outer side on the disc located on the same plane as the first area on the disc, wherein one of the first and second areas is assigned a recordable area and the other is assigned a read only area.

According to this optical record carrier, oppositely extending directions between the first and second tracks in the first and second areas eliminates the necessity of reverse rotation of the optical record carrier for the optical head for recording and/or reproducing the optical record carrier, whereby the optical head reads the first area from the inner side to the outer side on the disc and the second area from the outer side to the inner side on the disc.

Here, many drives available on the market generally rotate a disc counterclockwise viewed from an optical head. For example, the first direction is set such that when the drive rotates the disc counterclockwise the optical head traces the first area from the inner side to the outer side in a tracking state, whereas the second direction is set such that when the drive rotates the disc counterclockwise the optical head traces the second area from the outer side to the inner side in the tracking state. Alternatively, the first direction may be set such that when the drive rotates the disc clockwise the optical head traces the first area from the inner side to the outer side in the tracking state, whereas the second direction may be set such that when the drive rotates the disc clockwise the optical head traces the second area from the outer side to the inner side in the tracking state. In other words, the read only area may store data that has been written while the record carrier is being rotated clockwise viewed from the optical head of the drive for driving the record carrier.

The disc may be configured such that a manufacturer formats the one of the first and second areas, which has been assigned the read only area, while a user formats the other which has been assigned the recordable area. Then, a specific format which the manufacturer may usually form (for example, using pits) is arranged in the read only area, successfully prohibiting the user from copying data from the read only area, and contributing to prevention of unauthorized copying. In other words, a format for the read only area and a format for the recordable area may be different from each other. Where the disc is used such that software is stored in the one which is assigned the read only area, and the result of use of the software is stored in the other which is assigned the recordable area, a user of the optical record carrier does not have to additionally purchase a dedicated memory device (e.g., a memory card) for storing the result of the software (e.g., game software).

The first area has sequential address numbers provided from the inner side on the disc, while the second area has sequential address numbers provided from the outer side on the disc. The first and second areas are thus independently addressed. Since the recordable area is independent of the read only area, a disc control area including recording data, exchange data and other data in the recordable area is determined irrespective of the read only area and the recording and reproducing actions become stable in the disc.

The optical record carrier may further include a buffer area provided between the first and second areas and formed by crossing the first and second areas, information being unable to be recorded in and reproduced from said buffer area. The buffer area serves as a buffer area for the first and second (record) areas, so as to prevent a cross talk etc. from negatively affecting the recording and reproducing actions. The buffer area may be formed as a mirror surface, and the first and second areas may be formed by moving a head to both ends of the mirror surface. However, such a structure requires the precise head positioning. Accordingly, the buffer area is formed by crossing both areas and facilitates manufacturing.

In order to avoid the cross talk due to an optical interference of an optical spot, the optical record carrier may further include a buffer area provided between the first and second areas and at least twice as wide as the larger track pitch of one of the first and second areas, information being unable to be recorded in and reproduced from said buffer area. The buffer area may maintain independency between the first and second area. The width of the buffer area that has been set to be at least twice as wide as the larger track pitch (or an interval between tracks) of one of the first and second areas may reduce the cross talk sufficiently between two areas.

A disc-shaped optical record carrier of another aspect of the present invention includes first and second areas provided respectively in inner and outer portions on the disc, each of the first and second areas being assigned a record area of a different structure and having a track extending in the same direction, and a buffer area provided between the first and second areas and formed by crossing the first and second areas, information being unable to be recorded in and reproduced from the buffer area. The buffer area may maintain independency between the first and second area. As described above, one of the first and second areas may be assigned the read only area and the other may be assigned the recordable area. Alternatively, the record area of the different structure may be configured as one of a CD-R, a DVD-R, a CD-RW, a DVD-RW, a DVD+RW, a MO, a CD, a CD-ROM, a DVD-ROM, a DVD-RAM, a DVD video, and a DVD-Audio.

A disc-shaped optical record carrier of still another aspect of the present invention includes a first area having a spiral track extending in a first direction from an inner side on the disc, and a second area having a spiral track extending in a second direction opposite to the first direction, from an outer side on the disc located on the same plane as the first area on the disc, wherein each of the first and second areas being assigned a record area of a different structure. This optical record carrier has two, i.e., first and seconds record areas, and assigns a record area of a different structure to each area, increasing variations of information to be stored and applications. Depending upon the data amount of the ROM data and RAM data, an intersection between these data is positioned. As a result, a record area arrangement is available such that results in recording with the maximum recordable amount. Here, "a record area of a different structure" covers not only a record area having a different recording ability, such as a rewritable type, a write-once type, and a read only type, but also a record area having the same recording ability but having a different structure, such as a DVD-RAM and a DVD+RW. The record area of the different structure may be configured as one of a CD-R, a DVD-R, a CD-RW, a DVD-RW, a DVD+RW, a MO, a CD, a CD-ROM, a DVD-ROM, a DVD-RAM, a DVD video, and a DVD-Audio.

A drive of still another aspect of the present invention drives one of the above optical carriers. This drive drives the optical carrier and assists the optical carrier in exhibiting the above operations.

The drive may include an optical head for recording data in and/or reproducing data from the optical record carrier, a detecting mechanism for detecting a position of the optical head, a rotating mechanism for rotating the optical record carrier and driving the same, and a controller that determines a rotational direction for the optical record carrier by the rotating mechanism, based on positional information of the optical head detected by the detecting mechanism, and directional information representative of a direction in which a spiral track corresponding the optical head located at the position extends. Such a drive may control the rotational direction for the optical record carrier. The controller may obtain the directional information by a tracking action of the optical head. The optical head cannot trace tracks beyond the buffer area in tracking the optical record carrier so as to eliminate a cross talk.

A data updating method according to still another aspect of the present invention using the aforementioned disc-shaped optical record carrier includes the steps of storing basic data in one of the first and second areas which has been assigned the read only area, and storing data relating to the basic data in one of the first and second areas which has been assigned the recordable area. Here, "data relating to the basic data" includes a result prepared by using the basic data, and update information of the basic data. For example, where the game software is stored in the area that has been assigned to the read only area while a result prepared by using the software, a user of the optical record carrier does not have to additionally purchase a dedicated memory device for storing the result of the game software. The update information of basic data may be additional data or data which invalidates part of basic data. The update thus covers both addition and modification.

A software version-up method according to still another aspect of the present invention using the aforementioned disc-shaped optical record carrier includes the steps of storing software in one of the first and second areas which has been assigned the read only area, and storing version-up information for the software in one of the first and second areas which has been assigned the recordable area. This version-up method may provide a version-up service for those users who have the (basic) software by utilizing information etc. recorded in the read only area.

The software version-up method may further include the steps of determining whether the software has been stored in a predetermined state in the read only area, writing the version-up information in the recordable area when the determining step determines that the software has been stored in the read only area, and refusing to write the version-up information when the determining step determines that the software has not been stored in the read only area. The predetermined state may be that data relating to the software is stored in a specific region (e.g., with a specific address) in the read only area, or that the software is stored in the read only area while said record carrier is being rotated in a predetermined rotational direction (e.g. clockwise viewed from the optical head). Thereby, the version-up method may contribute to elimination of unauthorized copying.

Other objects and further features of the present invention will become readily apparent from the following description of preferred embodiments with reference to accompanying drawings.

DETAILED DESCRIPTION OF THE PREFERRED EMBODIMENTS

Figure 1:
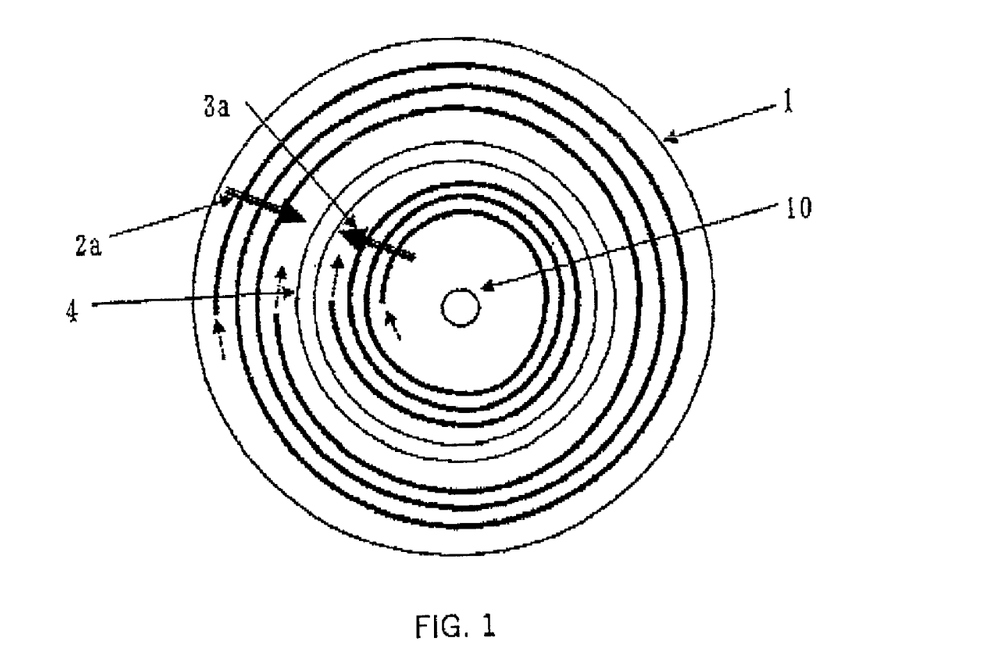
FIG. 1 is a plane view of an optical disc of a first embodiment according to the present invention.

Referring to FIG. 1, a description will now be given of an optical disc 1 as optical record carrier of the instant embodiment. Here, FIG. 1 is a schematic plane view of the optical disc 1. The optical disc 1 includes, around a center hole 10, a record area 2 having a spiral track 2a as a record unit, a record area 3, at the inner side the record area 2, which has a spiral track 3a extending in a direction reverse to the track 2a, and a buffer area 4 between the record areas 2 and 3.

Suppose that an optical head 150 in a drive 100 for driving the optical disc 1, which will be described later, is located above the optical disc 1. It is understood that as the optical disc 1 rotates counterclockwise viewed from the optical head 150, a record position in the record area 3 (or a position of the optical head 150) moves toward the outer side on the disc 1 while a record position in the record area 2 moves toward the inner side. Thus, the optical disc 1 is configured such that the record area 3 is recorded from the inner side to the outer side and the record area 2 is recorded from the outer side to the inner side. This configuration advantageously separates these record areas completely and enables them to be independently addressed. The instant embodiment provides the record area 2 with sequential address numbers from the outer side to the inner side and the record area 3 with sequential address numbers from the inner side to the outer side.

In the instant embodiment, the track 2a extends counterclockwise viewed from a point above the center hole 10 in FIG. 1, while the track 3a extends clockwise. Of course, from a viewpoint that two spiral tracks 2a and 3a extending in different directions are assigned to the record areas 2 and 3, the track 2a may extend clockwise viewed from the point above the center hole 10 in FIG. 1, while the track 3a may extend counterclockwise. In this case, when the drive 100 is configured to have a system that rotates the optical disc 1 clockwise viewed from the optical head 150, a record position in the record area 3 moves toward the outer side and a record position in the record area 2 moves toward the inner side.

The optical disc 1 of the instant embodiment thus includes two tracks 2a and 3a and addresses the record areas 2 and 3 independently. Here, suppose that the record area 2 is assigned a ROM area and the record area 3 is assigned a RAM area. This optical disc 1 has the following advantages over an optical disc (referred to as "single spiral optical disc") which has one spiral track provided with addresses as consecutive numbers and composed of the ROM and RAM areas:

According to the single spiral optical disc, address numbers in the RAM area change with a length of the ROM area. Therefore, the record control needs to calculate addresses in the RAM area taking the length of the ROM data into account, and disadvantageously results in an undefined control area for storing exchange information dependent upon recording. As another problem, when the capacity of the ROM area has not been defined in advance, the RAM area cannot be arranged efficiently and the maximum record capacity cannot be set.

On the other hand, the optical disc 1 of the instant embodiment independently creates and addresses the two record areas 2 and 3 to be assigned to the ROM and RAM areas. Thereby, the position of the RAM area can be fixed independent of the position of the ROM area, the recording action may become stable by using the stable exchange control, and the maximum record capacity can be easily set.

In addition, the optical disc 1 of the instant embodiment creates the record areas 2 and 3 independently, and enables them to be formatted differently. For example, the optical disc 1 may be configured such that a manufacturer formats the ROM area while a user formats the RAM area. This configuration may prohibit the user from copy data recorded in the ROM area easily (i.e., unless the user has equipment similar to manufacturer's), providing improved security against unauthorized copying of data stored in the ROM area. In other words, the optical disc 1 provides higher security than the single spiral optical disc.

When it is assumed that the optical disc 1 has a diameter, for example, of 120 mm, an inner portion from the center to 60 mm and an outer portion from 60 mm to 120 mm, the inner portion is assigned a RAM area of a write-once or rewritable type and the outer portion is assigned a ROM area of a read only (or unwritable) type. A description will be given of an exemplary manufacture of this optical disc 1.

When the inner portion is configured, for example, as a DVD-RW, a disc-shaped polycarbonate ("PC") board is molded with an outer diameter of 120 mm, an inner diameter of 40 mm, and a thickness of 0.6 mm, on which a DVD-RW format is formed with lead-in data, addresses, track servo grooves, etc. A record layer is then formed on a signal plane from the diameter of 40 mm to the diameter of 78 mm on the PC board by forming a transparent dielectric layer, a phase change record layer, a transparent dielectric layer, an Al alloy reflective layer in this order using a spatter method. Next, an ultraviolet ("UV") protective film layer is formed by applying UV hardening protective resin with a thickness of about 10 μm onto the reflective layer using a spin coat method, and hardening it with the UV radiation. The outer portion, which will be described later, is formed from the diameter of 80 mm to the diameter of 120 mm using a mask at the time of sputtering.

In configuring the inner portion as a DVD-R, a PC board is molded with an outer diameter of 120 mm, an inner diameter of 10 mm, and a thickness of 0.6 mm, on which a DVD-R format is formed with lead-in data, user data record area, and lead-out data. A record layer is then formed by applying color matter solution onto a signal plane on the PC board using the spin coat method and by layering an Au reflective layer onto a dried record layer from the diameter of 40 mm to the diameter of 78 mm. The UV protective layer is then formed by applying UV protective resin with a thickness of about 10 μm onto the reflective layer using a spin coat method, and hardening it with the UV radiation. The outer portion, which will be described later, is formed from the diameter of 80 mm to the diameter of 120 mm using a mask at the time of spin coating.

In configuring the inner portion as a DVD-RAM, a disc-shaped PC board is molded with an outer diameter of 120 mm, an inner diameter of 10 mm, and a thickness of 0.6 mm, on which a DVD-RAM format is formed with lead-in data, addresses, track servo grooves, etc. A record layer is then formed on a signal plane from the diameter of 40 mm to the diameter of 78 mm on the PC board by forming a transparent dielectric layer, a phase change record layer, a transparent dielectric layer, an Al alloy reflective layer in this order using a spatter method. A UV protective film layer is then formed by applying UV hardening protective resin with a thickness of about 10 μm onto the reflective layer using a spin coat method, and hardening it with the UV radiation. The outer portion, which will be described later, is formed from the diameter of 80 mm to the diameter of 120 mm using a mask at the time of sputtering. Of course, the inner portion may be structured as a CD-R or a CD-RW.

In configuring the outer portion as a DVD-ROM, the outer portion is formed next to one of the above inner portions using a DVD-ROM format with lead-in data, user data area, and lead-out data. An Al reflective layer is then s tacked onto the signal surface from the diameter 82 mm to the diameter of 119 mm using a sputter method so that the reflectivity may range from 45% to 50%. A UV protective film layer is then formed by applying UV hardening protective resin with a thickness of about 10 μm onto the reflective layer using the spin coat method, and hardening it with the UV radiation. The outer portion may, of course, be a CD, a CD-ROM, a DVD-video, etc.

It is sufficient that each of the inner and outer portions is assigned a record area of a different structure. The record area of the different structure may be arbitrarily configured as, but not limited to, one of a CD-R, a DVD-R, a CD-RW, a DVD-RW, a DVD+RW, a MO, a CD, a CD-ROM, a DVD-ROM, a DVD-RAM, a DVD video, and a DVD-Audio. Here, "a record area of a different structure" covers not only a record area having a different recording ability, such as a rewritable type, a write-once type, and a read only type, but also a record area having the same recording ability but having a different structure, such as a DVD-RAM and a DVD+RAM.

The arbitrary combination of these two record areas having different structures may be advantageously mixed such that, for example, the ROM area is recorded with a DVD-ROM format while the RAM area is recorded with a CD-R format. It is noted that the outer portion has a different format from that of the inner portion such that an arrangement of lead-in part etc. may be incompatible, whether the format uses a CD or DVD system. This is because, when the outer portion is assigned to the ROM area, a start position, which is otherwise designated by various formats, should be reset to the outer portion. A recording into the RAM area and mastering for the ROM area taking these points into account would create a uniquely addressed disc shared by the ROM and RAM areas.

A combination of the DVD-R, DVD-RW, DVD-RAM and DVD-ROM does not greatly change the configuration of conventional drives since they have the common format and modulation/demodulation systems. In particular, the recordable area, when provided in its inner portion, would enable the conventional drive to record.

The buffer area 4 is provided at a border between record areas 2 and 3, and information is recorded in and reproduced from the buffer area 4. The tracks 2a and 3a having different spiral directions end there. The buffer area 4 is provided in such a range that the recording/reproducing actions for neighboring addresses in the record areas 2 and 3 are not negatively affected by a cross talk etc. The range is that the width of the buffer area 4 is set to be at least twice as wide as the larger track pitch of both record areas 2 and 3.

The buffer area 4 is an undefined area for use purposes, and preferably formed as a mirror part which records nothing. Alternatively, the buffer area 4 may have a structure other than the mirror part, for example, by crossing the record areas 2 and 3 since the crossed area of both areas 2 and 3 is unusable and functions as a buffer area. Although it is possible to form the buffer area as a mirror part up to an end of each of the record areas 2a and 3a, the precise head positioning is needed in this case. On the other hand, crossing both tracks does not require the precise head positioning, advantageously facilitating the manufacture.

The optical disc 1 in this embodiment, unlike the optical disc 1A, which will be described later, has several advantages in a fixed rotary direction for drive's spindle motor and a smaller design change in the conventional drive. For example, when ROM data is recorded in the record area 2 and a RAM area is assigned to the inner portion up to a radial position corresponding to the record area 2, a conventional drive may record data in the RAM area.

Figure 2:
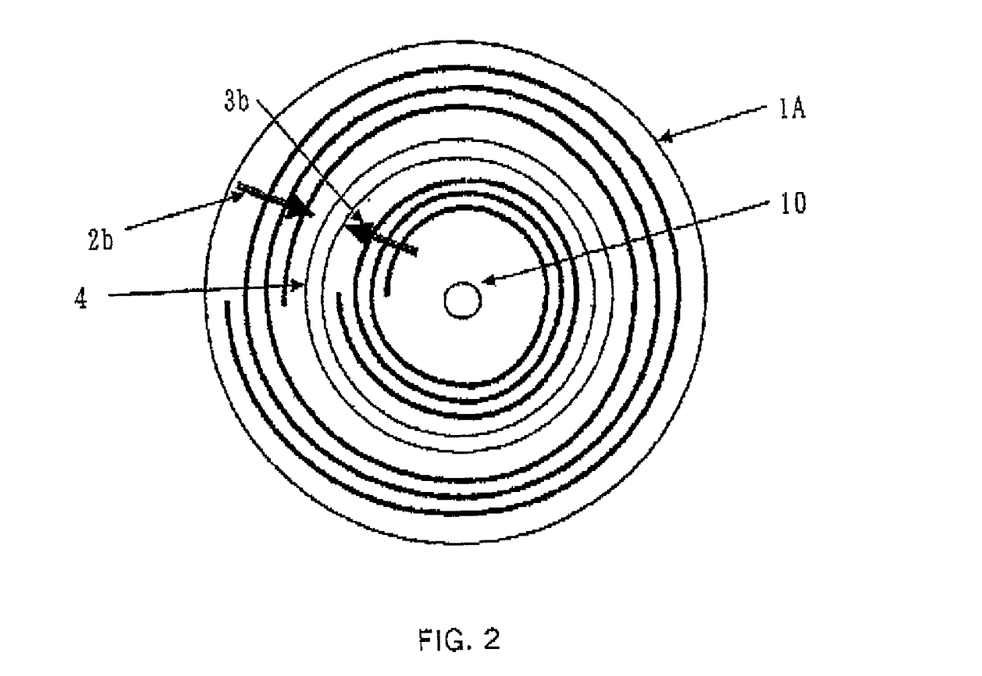
FIG. 2 is a plane view of an optical disc of a second embodiment according to the present invention.

A description will now be given of an optical disc 1A as an exemplary modification of the optical disc 1. Here, FIG. 2 shows a plane view of the optical disc 1A. Those elements in FIG. 2 which are the same as corresponding elements in FIG. 1 are designated by the same reference numerals, and a description thereof will be omitted. The optical disc 1A includes, around a center hole 10, a record area 2A having a spiral track 2b, a record area 3A, at the inner side the record area 2A, which has a spiral track 3b extending in a direction reverse to the track 2b, and the buffer area 4 between the record areas 2A and 3A.

Suppose that the optical head 150, which will be described later, is located above the optical disc 1A. It is understood that as the optical disc 1 rotates counterclockwise viewed from the optical head 150, a record position in each of the record areas 2A and 3A (or a position of the optical head 150) moves from the inner side to the outer side on the disc 1. In order to move the record, position from the outer side to the inner side in the record area 2A, a spindle motor 142, which will be described later, should be reversed for the record area 2A from counterclockwise to clockwise. As a result of the reverse rotation by the spindle motor 142, the optical disc 1A enables the record area 3A to be recorded from the inner side to the outer side and the record area 2A to be recorded from the outer side to the inner side. The optical disc 1A is advantageous, similar to the optical disc 1, in separating both record areas completely and enables them to be independently addressed. In other words, the optical disc 1A uses the reverse rotation by the spindle motor 142 to provide the record area 2A with sequential address numbers from the outer side to the inner side and the record area 3 with sequential address numbers from the inner side to the outer side.

In the instant embodiment, the tracks 2b and 3b extend clockwise viewed from a point above the center hole 10 in FIG. 2. Of course, from a viewpoint that two spiral tracks 2b and 3b extending in the same direction are assigned to the record areas 2A and 3A, the tracks 2b and 3b may extend counterclockwise viewed from the point above the center hole 10 in FIG. 2. In this case, when the drive 100 is configured to have a system that rotates the record area 3A clockwise but the record area 2A counterclockwise viewed from the optical head 150, a record position in the record area 3A moves toward the outer side and a record position in the record area 2A moves toward the inner side.

The optical disc 1A in this embodiment thus inverse the rotation of the spindle motor 142, but the record areas 2A and 3A have spiral tracks 2b and 3b extending in the same direction from the inner side to the outer side, simplifying the arrangement on the disc plane and thus facilitating the manufacture. The reverse rotation by the spindle motor 142 for record areas 2A and 3A realize a similar recording action to that for the optical disc 1.

The reverse rotation of the spindle motor 142 would easily distinguish between the ROM and RAM areas and prevents a mixture of them in the same record area. When the drive 100 has operational modes including a ROM mode for driving the ROM area and a RAM mode for driving the RAM area, the rotary direction of the spindle motor may be reversed by switching an operational mode of the drive 100 for driving the disc 1A between ROM and RAM modes.

Where it is unlikely to always access the ROM area, the spindle motor 142 may stop its rotation to save power by entering a sleep mode when there is no access. Such time isolation between an access to the ROM area and an access to the RAM area would result in independent address assignments for the RAM and ROM areas, and enhance congeniality to a simple ROM or RAM recording and/or reproducing system. When the record area 2A is assigned to the ROM area, the record area 2A is addressed from the outside to the inside by the reverse rotation of the spindle motor 142 so that the address number increases from the outer side to the inner side. This is the same as the conventional reproduction for a ROM disc recorded from the inner side, except that a start position and the rotary direction of the spindle motor are reversed to those in the conventional ROM. On the other hand, the record area 3A when assigned to the RAM area creates a lead-in area and a data record area from the inner side as in a CD-R. This is similar to a normal CD-R and compatible with the conventional write-once system, such as multiple sessions. The recording at this time is also similar to the normal CD-R drive.

The aforementioned ROM and RAM areas to be assigned to the record areas may be arranged oppositely: Then, the normal standard format applies to the ROM area while the RAM area is recorded from the outer side to the inner side. The data amount recorded in the ROM area determines a border between the ROM and RAM areas, and thus the range of the RAM area.

Figure 3:
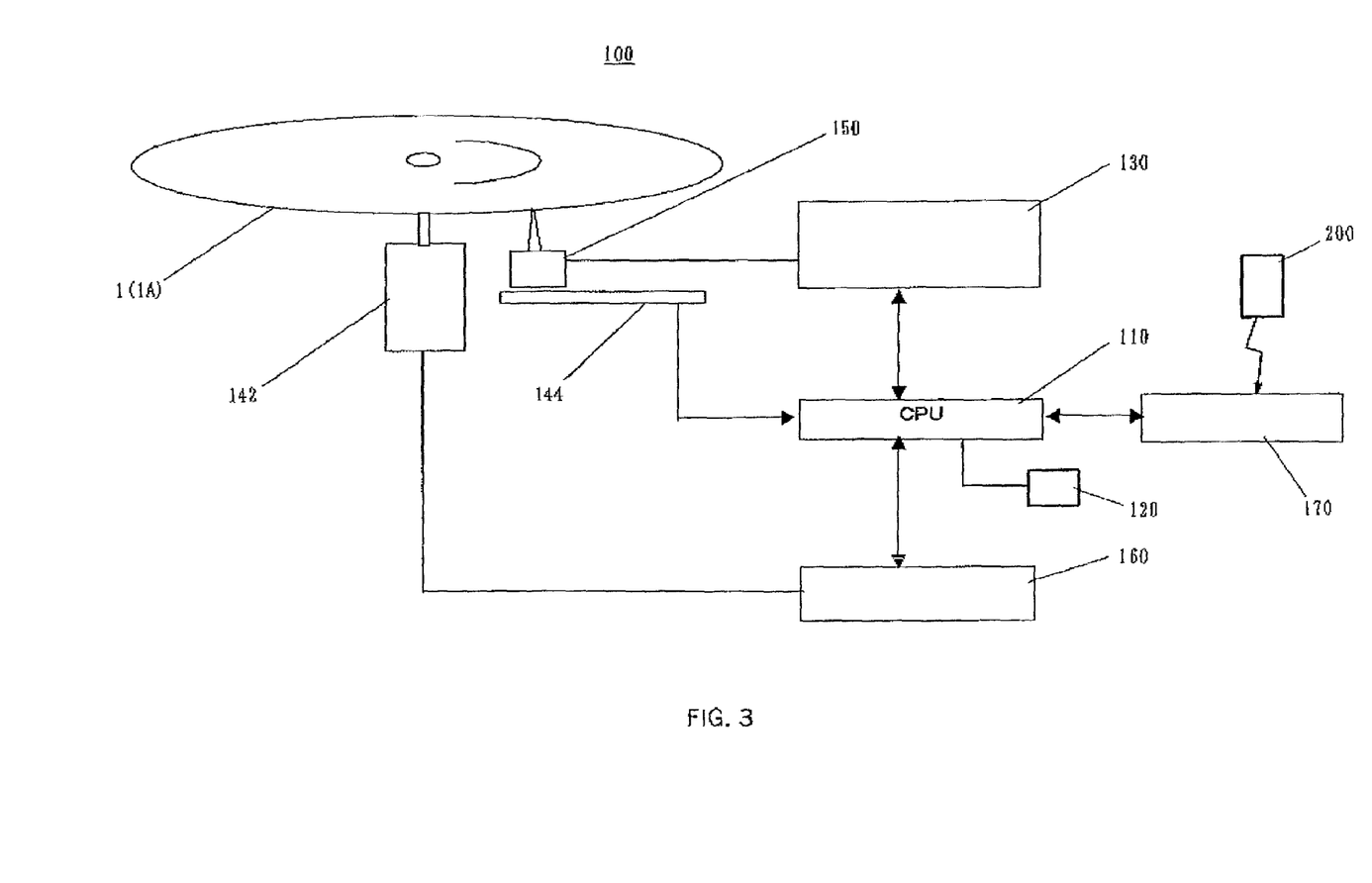
FIG. 3 is a block diagram of a drive unit for driving the optical discs shown FIGS. 1 and 2.

Referring now to FIG. 3, a description will be given of a disc drive 100 of the present invention for driving the optical disc 1. Here, FIG. 3 is a block diagram of the disc drive 100. The disc drive 100 includes a CPU 110, a memory 120, a recording/reproducing signal processor 130, a spindle motor 142, a scale 144, an optical head 150, a spindle controller 160, an interface 170, and accommodates the optical disc 1 in a removable manner. In the following description, the optical disc 1 generalizes the optical disc 1A unless otherwise specified.

The CPU 110 controls each part and communicates with a host 200 which will be discussed later. The memory 120 includes, a non-volatile memory, such as a ROM, for storing operational programs and data for the system, and a volatile memory, such as a RAM, for temporarily storing data read from the optical disc 1 by the optical head 150 and necessary control programs.

The recording/reproducing signal processor 130 processes a signal which the head 150 records in the optical disc 1, and a signal which the head 150 reproduces from the optical disc 1. More specifically, the recording/reproducing signal processor 130 processes a signal reproduced by the optical head 150, modulates a signal to be recorded, and sets recording conditions for the optical head 150. The spindle motor 142 rotates the disc 1 clockwise or counterclockwise viewed from the optical head 150.

The scale 144 detects a moving amount and a position of the optical head 150, and implemented as a magnetic scale unit. The magnetic scale unit includes, for example, a plurality of magnets provided in regular intervals in a longitudinal direction on a plate base fixed in the drive 100, and a magnetic sensor, such as a hole element, attached onto a carriage for moving the optical head 150 above the optical disc 1 and arranged opposite to the magnets. The magnets are aligned as N, S, N, S, viewed from the magnetic sensor, and the magnetic sensor detects a change of magnetic field. As the optical head 150 moves, the magnetic sensor moves relative to the base and the magnetic sensor outputs an electric signal changing with the changing magnetic field in frequency proportional to the relative speed between the optical head 150 and the base. Therefore, the relative moving amount between the optical head 150 and the base may be detected by counting the number of pulses included in this electric signal, and the relative moving speed between the optical bead 150 and the base may be detected by detecting the number of pulses included in the electric signal detected per unit time.

The optical head 150 irradiates a laser beam onto the optical disc 1 so as to record data in and/or reproduce data from the optical disc 1. In this way, the drive 100 in this embodiment uses one optical head 150 for two record areas 2 and 3. The spindle controller 160 controls rotational direction and speed of the spindle motor 142. The CPU controls recording/reproducing controls and a drive control based on positional information of the optical head 150 from the scale 144 and rotational information from the spindle controller 160. The interface 170 connects the drive 100 to an external device 200, such as a personal computer ("PC") as a host. Each component may use any structure known in the art, and thus a description of the detailed structure of each component is omitted.

A description will be given of a general operation of the drive 100. Although the drive 100 is a dedicated drive for driving the optical disc 1 or 1A in this embodiment, the drive 100 may drive the optical discs 1 and 1A and other optical discs in another embodiment. Where the drive 100 drives plural types of optical discs, the drive 100 initially identifies a type of optical disc that has been installed. As a result, the drive 100 identifies a type of optical disc and recognizes control information including the way of rotation and exchange information. The identification information is written, for example, onto an innermost control area and/or an outermost control area. The memory 120 has stored in advance conditions for reading the control area (such as an access position, the way of rotation (including the rotational speed and direction), power of a laser beam) as part of firmware.

A description will now be given of how the drive 100 drives the optical disc 1. The CPU 110 attempts to obtain control information from the disc 1 in response to a recording/reproducing command from the host (or PC in this embodiment) 200 connected to the drive 100. The memory 120 has previously stored the above conditions for accessing the control area to the optical disc 1 as part of firmware. The CPU 110 determines whether it has obtained the control information from a position above the optical disc 1 preset by the firmware stored in the memory 120. When the CPU 110 determines that it has not obtained the predetermined control information from the preset position, it determines that the drive 100 does not support the installed optical disc 1 and stops driving. At the same time, the CPU 110 notifies the host 200 of the fact so as to enable the host 200 to display the fact.

On the other hand, when the CPU 110 obtains the control information from the optical disc 1, the CPU 110 recognizes the structure of the optical disc 1 (such as an arrangement of the ROM area and RAM area). When the optical disc 1 is provided with the ROM and RAM areas, in executing the recording/reproducing command from the host 200, the CPU 110 allows the optical head 150 located above the ROM area to reproduce data from it and the optical head 150 located above the RAM area to record data in and reproduce data from it.

More specifically, the recording/reproducing signal processor 130 demodulates signals reproduced from the ROM and RAM areas, and the CPU 110 sends them to the host 200 through the interface 170. The host 200 outputs the information through an output device such as a display and a speaker. The information the CPU 110 receives from the host through the interface 170 is modulated by the recording/reproducing signal processor 130 and then written onto the RAM area by the optical head 150.

The CPU 110 may determine the rotational direction of the optical disc 1 by an initial operation. For example, when an output from the scale 144 specifies the spiral direction, the CPU 110 positions the optical head 150 onto a specific position above the optical disc 1 in the initial operation. As a result, the CPU 110 specifies the spiral direction and thus the rotational direction of the spindle motor 142.

The CPU 110 may detect the spiral direction using a tracking action. Since the tracks 2a and 3a are formed like a spiral, a moving direction of the optical head 150 may be recognized from scale information as the optical head 150 moves forward in the tracking state. The CPU 110 maintains the rotational direction of the spindle motor 142 when determining that the moving direction is normal in view of the format (i.e., when determining that the current rotational direction of the spindle motor 142 maintains that a record position in the record area 3 moves from the inner side to the outer side and a record position in the record area 2 moves from the outer side to the inner side). On the other hand, the CPU 110 instructs the spindle controller 160 to reverse the rotational direction of the spindle 142, when determining that the moving direction of the optical head 150 is not normal. The CPU 110 determines whether it is normal in view of the format based on a reproduced signal from the recording/reproducing signal processor 130. The CPU 110 determines that the optical disc 1 is driven in an appropriate rotational direction when receiving an appropriate signal from the reproduced signal.

As described above, since the rotational direction of the spindle motor 142 does not change for the optical disc 1, the CPU 110 maintains the rotational direction of the spindle motor 142 for the other record area.

The drive 100 in this embodiment neither intentionally detects the buffer area 4 in using the optical disc 1, nor controls the rotation based on the buffer area 4. The optical disc 1 has the tracks 2a and 3a extending in the opposite spiral directions, and the optical head 150 cannot move beyond the buffer area 4 in tracing one of tracks during the tracking operation. Thus, the buffer area 4 serves as a guard band automatically.

When the optical disc 1A is used, the CPU 110 controls the rotary direction of the spindle motor 142 through the spindle controller 160 depending upon a position of the optical head 150. The recording/reproducing operations other than the rotation control over the optical disc 1A are similar to those for the optical disc 1. The CPU 110 may use the aforementioned control information, initial operation, and tracking action to determine the rotational direction for the optical disc 1A. For example, since the spindle motor 142 reverses the rotational direction for the record areas 2A and 3A as discussed above, the CPU 110 executes the above initial operation and tracking action for both the record areas 2A and 3A.

The CPU 110 determines whether the optical head 150 is located above the record area 2A or 3A by detecting an address there, while the CPU 110 recognizes the buffer area 4 by a detection of the mirror part or a continuous readout error of an address (since recorded data in a reverse rotational direction cannot be read with the non-reversed rotational direction).

The optical disc 1 of the present invention has various applications. A description will now be given of exemplary applications of the optical disc 1.

For example, for some game software, a user may use the game software that has been recorded in the ROM area and record a game result in the RAM area. The conventionally available CD-ROM game software cannot record a game result, and the user should inconveniently purchase a dedicated memory card specific for the game machine). Indeed, a disc has a record area enough to store the game result. The optical discs 1 and 1A are advantageous in economic and resource aspects since a user doe not have to purchase the memory card.

Figure 4:
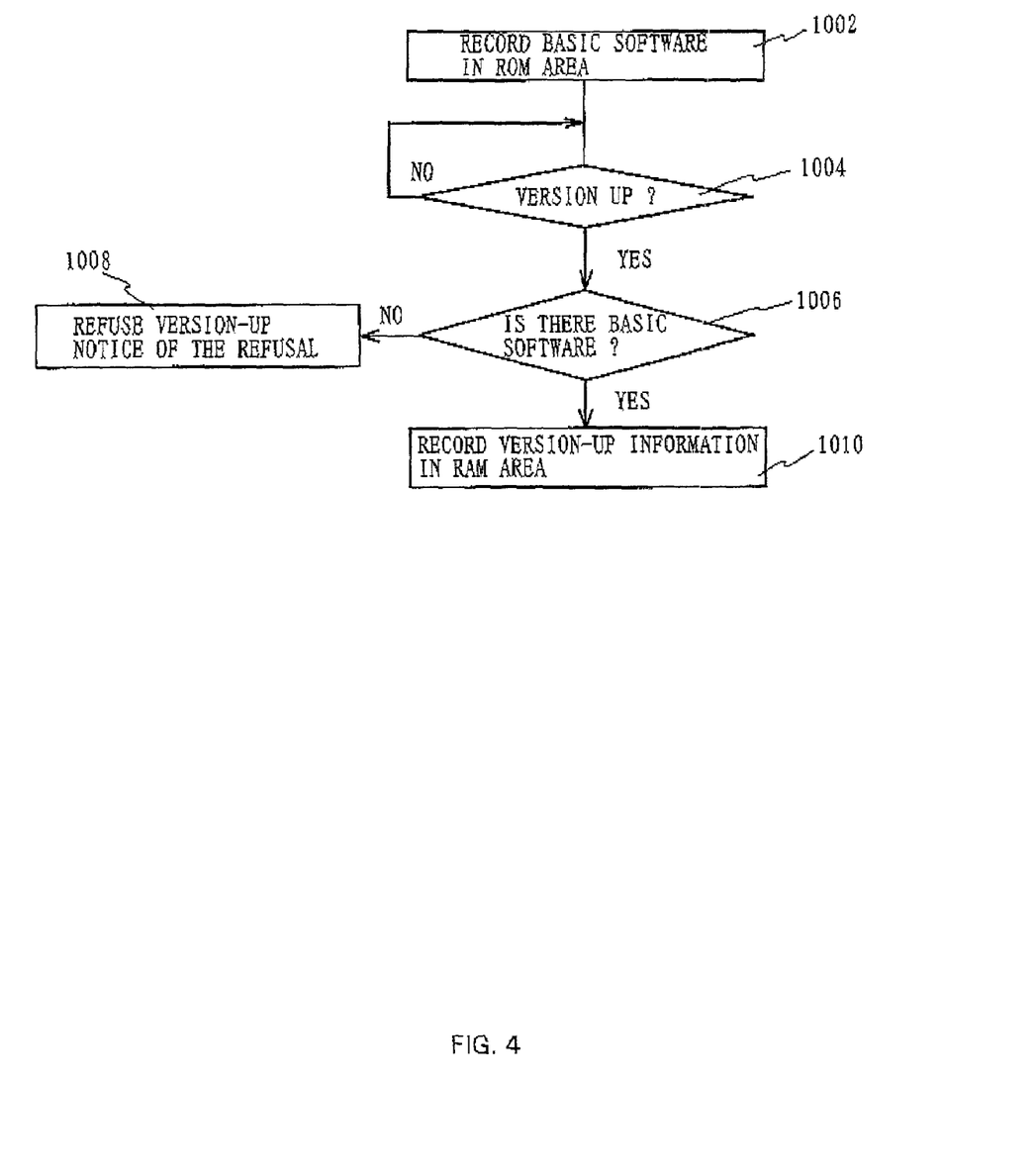
FIG. 4 is a flowchart showing an exemplary application of the discs shown in FIGS. 1 and 2.

In addition, some software is upgraded. With the instant optical discs 1 and 1A, only a user as an authorized person may receive an upgrade or version-up service. A description will now be given of such an application, with reference to FIG. 4. Here, FIG. 4 is a flowchart showing a version-up method as an application of the optical disc 1 and 1A (hereinafter the optical disc 1 generalizes the optical discs 1 and 1A). As a premise, the ROM and RAM areas are formed onto the optical disc 1. In this example, the ROM area is formed in the record area 2 and the RAM area is formed in the record area 3.

First, certain basic software (such as a game software) is recorded in the record area 2 as the ROM area so that it cannot be rewritten. The basic software may be the first version ox any other version. In this embodiment, the basic software is referred to as software recorded in the ROM area so that it cannot be rewritten.

It is assumed that this embodiment distributes the version-up information as compressed data through the Internet, and requires a key or password to decompress the compressed data.

In upgrading a version of the basic software (step 1004), the host 200 downloads the version-up information through the Internet. Next, the host 200 requests the CPU 110 in the drive 100 for the key or password.

In response, the CPU 110 determines whether the user requesting the version-up possesses the authorized basic software (step 1006). The CPU 110 determines that, for example, by determining whether the basic software or its identification data is stored in a specific region in the ROM area and in a predetermined rotational direction.

Therefore, the CPU 110 refuses the version-up and notifies the drive 200 of the refusal when determining that the basic software is stored in the RAM area, that an identifier of the basic software is not stored in the specific region in the ROM area, and that the basis software is written down in a rotational direction reverse to an expected rotational direction (step 1008). The host 200 indicates the refusal in the display (not shown). The refusal by the CPU 110 means that it does not or cannot provide the host 200 with the key or password to decompress the compressed data of the version-up information. As a result, the user cannot obtain the version-up information.

On the other hand, as the CPU 110 determines that the user who requests the version-up information possesses the authorized basic software, the CPU 110 provides the host 200 with the key or password. Then, the host 200 sends the decompressed version-up information to the drive 100 and instructs the CPU 110 to store it in the RAM area. In response, the CPU 110 stores the version-up information in the record area 3 (step 1010). Thereby, only the authorized user who has purchased the basic software is entitled to receive the version-up service. Thus, the optical discs 1 and 1A may advantageously store data relating to the data stored in the ROM area (i.e., additional data, update data, supplemental data, etc) in the RAM area.

Further, the present invention is not limited to these preferred embodiments, and various variations and modifications may be made without departing from the scope of the present invention. For example, as mentioned above, the present invention is not limited to DVD type discs, but is applicable to day optical disc.

The optical record carrier of the present invention thus assigns a record area of different structure (rewritable type, write-once type, read only type etc.) to each of the first and second areas, increasing variations of information to be stored and applications of the optical record carrier, recording various information in accordance with diversified needs, and realizing the stable recording and/or reproducing actions.

What is claimed is:

1. A disc shaped optical record carrier comprising:
   first area having a spiral track extending in a first direction from an inner side on the disc; and
   a second area having a spiral track extending in a second direction opposite to the first direction, from an outer side on the disc located on the same plane as said first area on the disc,
   wherein one of said first and second areas is assigned a recordable area and the other is assigned a read only area.

2. An optical record carrier according to claim 1, wherein said first area has sequential address numbers provided from the inner side on the disc, while said second area has sequential address numbers provided from the outer side on the disc.

3. An optical record carrier according to claim 1, further comprising a buffer area provided between said first and second areas and formed by crossing said first and second areas, information being unable to be recorded in and reproduced from said buffer area.

4. An optical record carrier according to claim 1, further comprising a buffer area provided between said first and second areas and at least twice as wide as the larger track pitch of one of said first and second areas, information being unable to be recorded in and reproduced from said buffer area.

5. An optical record carrier according to claim 1, wherein the read only area stores that has been data written by rotating said optical record carrier clockwise viewed from an optical head in a drive for driving said optical record carrier.

6. A disc shaped optical record carrier comprising:
   first and second areas provided respectively in inner and outer portions on the disc, each of said first and second areas being assigned a record area of a different structure and having a track extending in the same direction; and
   a buffer area provided between said first and second areas and formed by crossing said first and second areas, information being unable to be recorded in and reproduced from said buffer area.

7. An optical record carrier according to claim 6, wherein one of said first and second areas is assigned a recordable area and the other is assigned a read only area.

8. An optical record carrier according to claim 6, wherein the record area of the different structure is configured as one of a CD-R, a DVD-R, a CD=RW, a DVD-RW, a DVD+RW, a MO, a CD, a CD-ROM, a DVD-ROM, a DVD-RAM, a DVD video, and a DVD Audio.

9. A disc shaped optical record carrier comprising:
   a first area having a spiral track extending in a first direction from an inner side on the disc; and
   a second area having a spiral track extending in a second direction opposite to the first direction, from an outer side on the disc located on the same plane as said first area on the disc, wherein each of said first and second areas being assigned a record area of a different structure.

10. An optical record carrier according to claim 9, wherein the record area of the different structure is configured as one of a CD-R, a DVD-R, a CD-RW, a DVD-RW, a DVD+RW, a MO, a CD, a CD-ROM, a DVD-ROM, a DVD-RAM, a DVD video, and a DVD Audio.

11. A drive for driving a disc shaped optical record carrier that comprises a first area having a spiral track extending in a first direction from an inner side on the disc, and a second area having a spiral track extending in a second direction opposite to the first direction, from an outer side on the disc located on the same plane as said first area on the disc, wherein one of said first and second tracks is assigned a recordable area and the other is assigned a read only area.

12. A drive for driving a disc shaped optical record carrier that comprises first and second areas provided respectively in inner and outer portions on the disc, each of said first and second areas being assigned a record area of a different structure and having a track extending in the same direction, and a buffer area provided between said first and second areas and formed by crossing said first and second areas, information being unable to be recorded in and reproduced from said buffer area.

13. A drive according to claim 12, comprising:
   an optical head for recording data in and/or reproducing data from said optical record carrier;
   a detecting mechanism for detecting a position of said optical head;
   a rotating mechanism for rotating said optical record carrier and driving the same; and
   a controller that determines a rotational direction for said optical record carrier by said rotating mechanism, based on positional information of said optical head detected by said detecting mechanism, and directional information representative of a direction in which a spiral track corresponding said optical head located at the position extends.

14. A drive according to claim 13, wherein said controller obtains the directional information by a tracking action of said optical head.

15. A drive according to claim 13, wherein said optical head cannot trace tracks beyond the buffer area in tracking said optical record carrier.

16. A drive for driving a disc shaped optical record carrier that comprises a first area having a spiral track extending in a first direction from an inner side on the disc, and a second area having a spiral track extending in a second direction opposite to the first direction, from an outer side on the disc located on the same plane as said first area on the disc, wherein each of said first and second areas being assigned a record area of a different structure.

17. A drive according to claim 16, wherein said drive comprises:
   an optical head for recording data in and/or reproducing data from said optical record carrier;
   a detecting mechanism for detecting a position of said optical head;
   a rotating mechanism for driving said optical record carrier by rotating said optical record carrier; and
   a controller that determines a rotational direction for said optical record carrier by said rotating mechanism, based on positional information of said optical head detected by said detecting mechanism, and directional information representative of a direction in which a spiral track corresponding said optical head located at the position extends.

18. A drive according to claim 17, wherein said controller obtains the directional information by a tracking action of said optical head.

* * * * *